(12) United States Patent
Nakao

(10) Patent No.: US 7,522,032 B2
(45) Date of Patent: Apr. 21, 2009

(54) METHOD FOR DETECTING DECREASE IN INNER PRESSURE OF TIRE USING GPS SPEED INFORMATION

(75) Inventor: Yukio Nakao, Kobe (JP)

(73) Assignee: Sumitomo Rubber Industries, Ltd., Kobe-Shi, Hyogo-Ken (JP)

( * ) Notice: Subject to any disclaimer, the term of this patent is extended or adjusted under 35 U.S.C. 154(b) by 267 days.

(21) Appl. No.: 11/491,971

(22) Filed: Jul. 25, 2006

(65) Prior Publication Data
US 2007/0034000 A1 Feb. 15, 2007

(30) Foreign Application Priority Data
Aug. 9, 2005 (JP) ............................. 2005-230791

(51) Int. Cl.
*B60C 23/00* (2006.01)
(52) U.S. Cl. ...................... 340/444; 73/146.2; 340/443; 340/447
(58) Field of Classification Search ......... 340/442–447; 73/146.2, 146.5; 702/142; 701/74, 29
See application file for complete search history.

(56) References Cited

U.S. PATENT DOCUMENTS

| 6,044,313 | A | 3/2000 | Gannon |
| 6,426,694 | B1 * | 7/2002 | Larson ........................ 340/441 |
| 2004/0207518 | A1 * | 10/2004 | Tamimi et al. ............... 340/443 |
| 2004/0225423 | A1 * | 11/2004 | Carlson et al. ................ 701/36 |
| 2005/0030170 | A1 * | 2/2005 | Rieck et al. .................. 340/443 |
| 2005/0113992 | A1 * | 5/2005 | Kitano ......................... 701/29 |

FOREIGN PATENT DOCUMENTS

| EP | 001752317 A2 * | 7/2006 |
| JP | 11-295190 A | 10/1999 |
| JP | 2002-002240 A | 1/2002 |
| JP | 2002-362117 A | 12/2002 |

(Continued)

*Primary Examiner*—Brent Swarthout
(74) *Attorney, Agent, or Firm*—Birch, Stewart, Kolasch & Birch, LLP

(57) ABSTRACT

Provided is a method for detecting decrease in an inner pressure of a tire with excellent accuracy by calculating accurate dynamic load radii by comparing the GPS speed information with tire rotational speed information collecting data only when a stable measurement of the dynamic load radii is possible, as well as by utilizing GPS positioning information for a running state of a vehicle, and an apparatus and a program thereof.

The present invention is characterized in judging decrease in an inner pressure of a tire from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

16 Claims, 2 Drawing Sheets

FOREIGN PATENT DOCUMENTS

| | | |
|---|---|---|
| JP | 2003-094920 A | 4/2003 |
| JP | 2003-146037 A | 5/2003 |
| JP | 2004-237947 A | 8/2004 |
| KR | 1999-0048323 A | 7/1999 |
| KR | 2003-0076709 A | 9/2003 |

* cited by examiner

METHOD FOR DETECTING DECREASE IN INNER PRESSURE OF TIRE USING GPS SPEED INFORMATION

BACKGROUND OF THE INVENTION

The present invention relates to a method for realizing an apparatus for detecting decrease in an inner pressure of a tire with excellent accuracy at a low cost.

JP-A-2005-186739, JP-A-2003-146037 and JP-A-2003-94920 disclose a method of detecting decrease in an inner pressure of a tire from a vehicle speed calculated from GPS information, a distance, and a tire rotational number.

However, in order to detect decrease in an inner pressure of a tire from the vehicle speed calculated from GPS information and the tire rotational speed, it is necessary to detect change of the tire rotational speed only by decreasing the inner pressure. Namely, it is necessary to exclude the change of the rotational speed caused by a running state of a vehicle.

JP-A-2003-94920 discloses a method for detecting decrease in an air pressure of a tire by comparing a running track of a vehicle calculated from information of tire rotation with a running track of a vehicle obtained from the vehicle positioning information using such as GPS, but it does not indicate that the change of the rotational speed caused by the running state of a vehicle is excluded.

JP-A-2005-186739 and JP-A-2003-146037 specify the running state from the comparison of rotation states of the mutual tires, but when decrease in an inner pressure of a tire occurs, the relation of the mutual rotational speeds of four wheels already loses a balance, and an accurate running state cannot be specified.

Further, a method of detecting decrease in an inner pressure of a tire by calculating the tire dynamic load radii from the movement distance calculated from GPS information and the tire rotational numbers is known, but since the exclusion of the change of rotational numbers caused by the running state of a vehicle is inadequate, accuracy is inadequate.

SUMMARY OF THE INVENTION

An object of the present invention is to provide a method for detecting decrease in an inner pressure of a tire with excellent accuracy by calculating accurate dynamic load radii by comparing the GPS speed information with tire rotational speed information collecting data only when a stable measurement of the dynamic load radii is possible, as well as by utilizing GPS positioning information for a running state of a vehicle, and an apparatus and a program thereof The first embodiment of the present invention is a method for judging decrease in an inner pressure of a tire from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

It is preferable that even when the dynamic load radius values are continuously judged to be effective, any measured values are judged to be ineffective if change in size of dynamic load radius measured values exceeds a predetermined degree of change, and decrease in an inner pressure is judged only by measured values other than the ineffective measured values.

It is preferable that when the dynamic load radius values are continuously judged to be effective, average values of respective four wheels are calculated, and decrease in an inner pressure is judged by the average values.

It is preferable that decrease in an inner pressure of a tire is judged by comparing the dynamic load radius values judged to be effective with the initial value preliminarily stored as the dynamic load radius value by every speed at a normal inner pressure based on the calculated speed of the vehicle by the GPS device at the time.

It is preferable that decrease in an inner pressure of a tire is judged by comparing the dynamic load radius values judged to be effective with the initial value preliminarily stored as the dynamic load radius value by every speed at a normal inner pressure obtained by classifying results of measuring the dynamic load radii based on the calculated speed of the vehicle by the GPS device at the time.

It is preferable that a predetermined number for every speed range is stored in a certain time range, and only when population variance sizes of the respective four wheels are smaller than a specified value, decrease in an inner pressure is judged by the average values of the respective four wheels.

It is preferable that when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

The second embodiment of the present invention is an apparatus for judging decrease in an inner pressure of a tire from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

The third embodiment of the present invention is a calculation program for judging decrease in an inner pressure of a tire from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

It is preferable to be characterized in that when a time at calculating a GPS speed differs from a time at calculating the tire rotational speed, the dynamic load radius is calculated by modifying one of results of calculated speeds to a speed considering time change for time difference and successively comparing the speeds.

DETAILED DESCRIPTION

Figure 1:
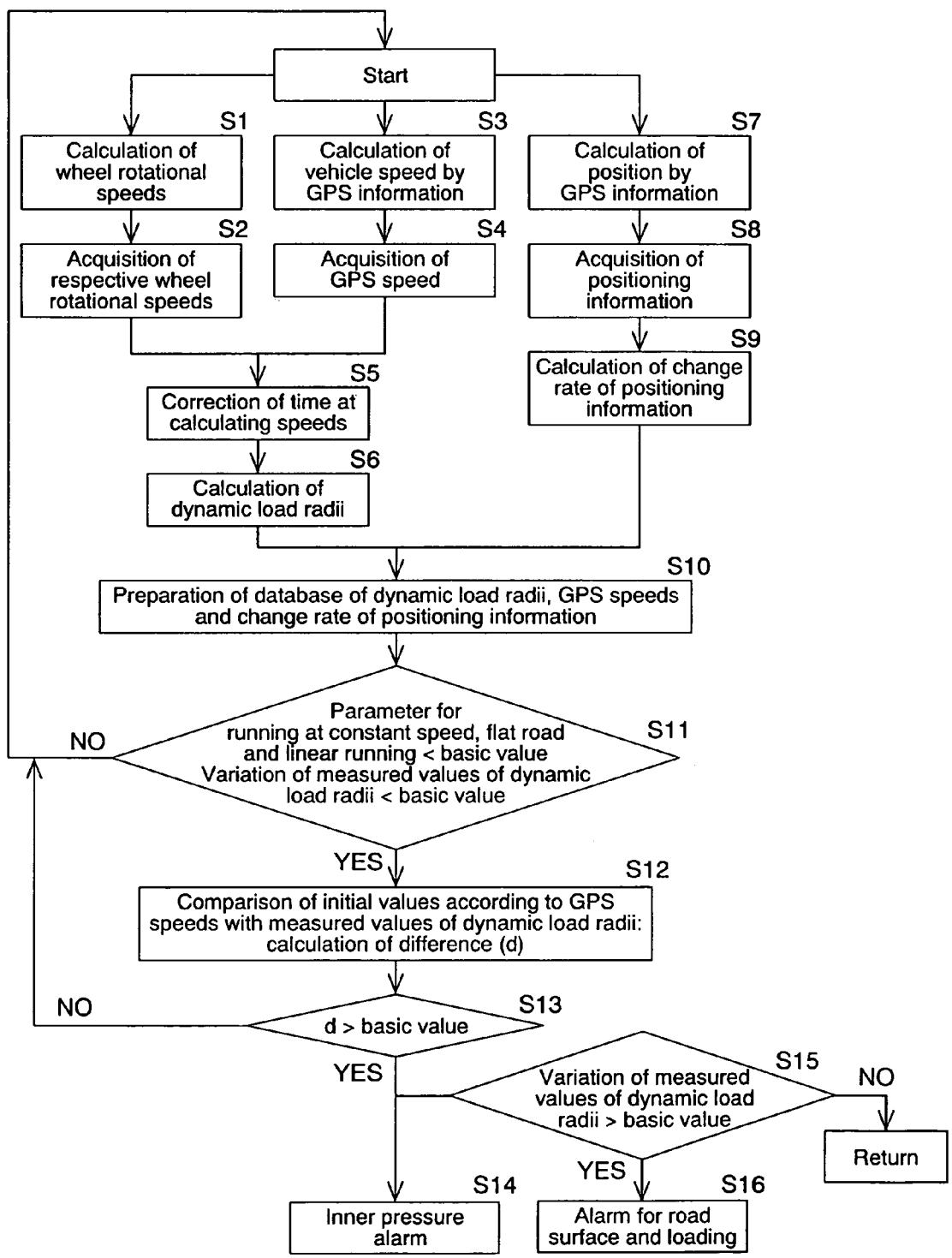
FIG. 1 is a flow chart to carry out a calculation program for calculating tire dynamic load radius and detecting decrease in an inner pressure of a tire.

GPS devices have been loaded on many vehicles due to prevalence of car navigations. Consequently, positioning technology by a GPS device has been also improved and a device (GPS type speed meter VBOX manufactured by Race Logic Inc., England) specified in calculating a speed is also commercially available.

The present inventors have developed a system for detecting decrease in an air pressure of a tire by using a calculated speed by a speed meter using the GPS information (hereinafter, referred to as GPS speed).

If it is assumed that there is no slip on a tire, the tire dynamic load radius (R) can be calculated by using the GPS speed as a vehicle speed and comparing the vehicle speed with the tire rotational speeds (rotational number per a unit time) at the time.

$$V(m/s) = 2\pi R(m) \cdot Freq(Hz)/N(number)$$

N is the number of teeth per one rotation of an axle of a tire rotational speed detection device. Freq (Hz) is the number of the teeth in the rotational speed detection device counted per one second.

Herein, when V is replaced by Vgps (km/h), an output from the GPS speed meter, $$Vgps(km/h) = 2\pi R(m) \cdot Freq(Hz) \cdot 3.6/N(number)$$

Consequently, $R(m) = (N/2\pi \cdot 3.6) \cdot Vgps(km/h)/freq(Hz)$ (1)

In the case of N=48, the dynamic load radius is:

$$R(m) = 2.122066 \cdot Vgps(km/h)/Freq(Hz) \quad (1)'$$

As described above, when the influence of a slip ratio can be excluded at straight running, a dynamic load radius of a tire during running can be measured (calculated).

Further, when an inner pressure is lowered, the tire dynamic load radius is decreased. Therefore, if the tire dynamic load radius during running can be accurately measured, decrease in the inner pressure of a tire can be detected.

With respect to an output frequency and an output accuracy of the GPS speed meter, in the case of using the above-mentioned VBOX, the accuracy of 0.01 km/h at an output of 20 Hz is published.

According to this accuracy, it indicates that when a speed is at least 10 km/h, at least 0.1% of the accuracy can be obtained. Thus, detection accuracy is sufficient since change in the dynamic load radius of a general tire when the inner pressure of the tire is lowered by 25% is several tenths %.

However, in order to accurately measure (calculate) the tire dynamic load radius, it is necessary to prevent influence of the change in the tire rotational speed caused by other than the change in the tire inner pressure which is a purpose of the measurement. Namely, measurement data of the tire rotational speed influenced by causes other than the tire inner pressure is required to be excluded as ineffective data so as not to be utilized for calculation of the dynamic load radius.

Change of slip ratios is remarkable when a vehicle is accelerated or decelerated. In addition, the slip ratios of driving wheels change due to influence of gravity acceleration even during running at a constant speed in the case of running on a sloping road.

Further, since rotational speeds are different between the running track of the inner wheel side and that of the outer wheel side at turning a steering wheel, the result of measuring the dynamic load radius is affected.

(1) As a countermeasure against that, it has been developed to utilize the GPS positioning information. For judging whether running is straight or not, a traveling direction can be obtained from the GPS positioning information, and it can be judged from variation per a unit time whether the running is straight or not. For judging whether a vehicle is running on a flat road or not, an altitude thereof can be obtained from the GPS positioning information in the same manner, and it can be judged from the variation per a unit time whether the vehicle is running on a flat road or not. Further, as for acceleration and deceleration, running at a constant speed can be judged from a degree of the acceleration by time-differentiating the calculated GPS speed information.

Thus, running conditions of a vehicle can be judged by utilizing the GPS information with high accuracy, and a range of the running conditions at which the data of the tire rotational speeds is suitable for calculation of the dynamic load radius can be limited by providing a certain basis.

(2) Even when the running conditions are limited, the detection accuracy of the tire rotational speeds is important for the measurement of the dynamic load radius. The tire rotational speeds may occasionally include momentary fluctuation such as influence of unevenness on a road surface and a case of stepping on a lid of a manhole. As a method of excluding those fluctuation components, a method for judging whether even the dynamic load radius judged to be effective in the above description (1) are appropriate or not from the variation when the fluctuation continuously occurs has been developed.

(3) Further, a method of further improving accuracy by using the average value as a representative value even if the fluctuation of measured values is small has been developed.

(4) It is known that the tire dynamic load radius is affected by a speed. Namely, a tread part is stretched by the centrifugal force caused by tire rotation and the peripheral length of the tire is elongated, and as a result, the rotational speed becomes slow. Further, when the load is enlarged, a ground contact area of the tire is increased and the dynamic load radius is lowered, and as a result, the rotational speed becomes fast. In addition, the load is affected not only by the number of crews and loading, but also an aerodynamic force caused by running of a vehicle. As a countermeasure, a method of preliminarily setting a basic value by a speed and comparing using the speed information by GPS has been developed.

(5) As another method, it has been developed that the measurement results of the dynamic load radius are stratified by the GPS speed. Thereby, judgment of decrease in an inner pressure excluding the influence by a speed becomes possible by preliminarily storing the basic value of the dynamic load radius in respective speed ranges at a normal inner pressure as the initial value.

(6) Since accuracy can be improved by using a statistical means in the above method, a method using the statistical means has been developed.

(7) The tire slip ratios of driving wheels are influenced by easiness of slipping on a road surface. As a countermeasure against that, it has been developed that differences of measured values of the dynamic load radii of the front wheels and the rear wheels from the basic value are considered as indices. On a slippery road surface, only the rotational speed on a side of the driving wheels increases, and the inner pressure tends to be judged as being lowered as the measurement result of the dynamic load radii. In order to inform the phenomenon to a driver, alarm of road slippage is generated together separately from the inner pressure alarm. Further, concerning the influence by the load, since the axle loads of the front and rear axles are changed in the case of extreme loading, detection can be carried out setting the difference of change of the front and rear wheels as an index in the same manner, and the influence by the dynamic load radii by the load can be also informed to a driver by generating together the alarm of loading.

The improvement in the program of the present invention is securing time synchronism property. When time at calculating speeds by the GPS speed meter does not coincide with time at calculating the tire rotational speeds, accurate dynamic load radii are not obtained. Considering these time differences, it has been developed that either of the measured values of speeds are modified by the time difference in accordance with a degree of the change and the speeds at a same time are deduced to be calculated.

Figure 2:
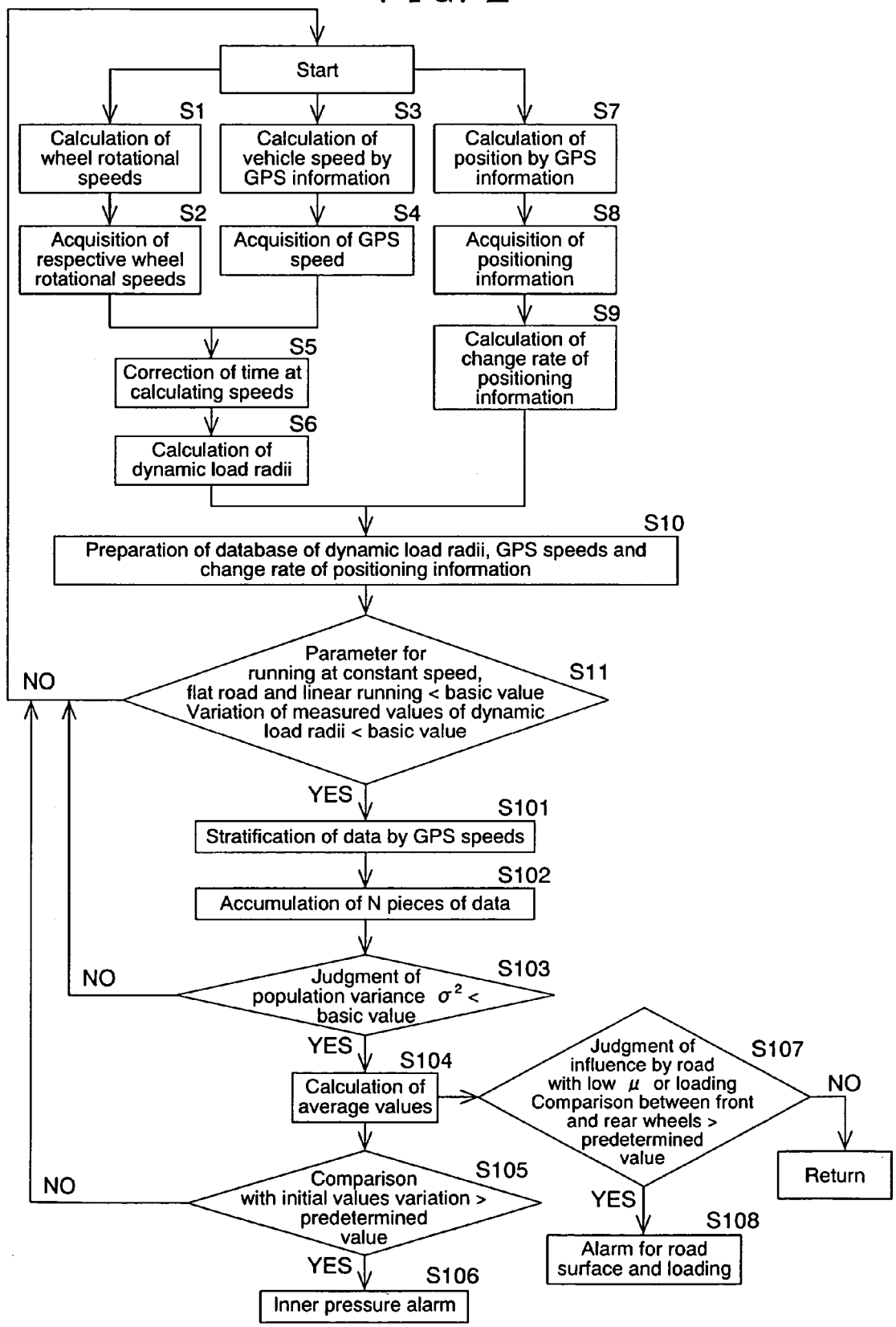
FIG. 2 is a flow chart illustrating a method of using an average of measured values for improving accuracy of the measurement (calculation) of a dynamic load radius, and a calculation program in the case of using a statistical means for selecting data adopted for calculation of the average value.

The calculation program for calculating the tire dynamic load radii and detecting decrease in an inner pressure of a tire based on the technical explanation as described above is illustrated referring to the flow charts of FIG. 1 and FIG. 2.

In FIG. 1, rotational speeds of respective wheels are acquired (calculated) at steps S1 and S2 based on output signals of the wheel (tire) rotational speed detection device.

The running speed of a vehicle based on the GPS information is acquired at steps S3 and S4.

At step S5, with respect to either one of the time to calculate the wheel rotational speeds and the time to calculate GPS speed, a value at the same time as the other is calculated by interpolation, and the values at the same time are calculated to be synchronized.

At step S6, dynamic load radii of the respective wheels are calculated from the respective wheel rotational speeds and the GPS speed of the vehicle.

At steps S7, S8 and S9, a time rate of change of the GPS positioning information is calculated and values on the running conditions such as the ascending speed and descending speed on a sloped road, dextrorotary angular velocity and levorotary angular velocity by handling are calculated based on the calculated time rate of change. Acceleration and deceleration may be calculated at either of steps S4 and S9.

At step S10, combinations such as the dynamic load radii, the GPS speed and the change rate of the positioning information are acquired under various running conditions to form database, and the initialization of the database is carried out. The database also includes respective judgment basic values.

At step S11, it is judged whether the running conditions satisfy conditions such as running at a constant speed, running on a flat road and linear running by comparing with the respective judgment basic values to find out whether the date obtained during actual running is suitable for data for detecting an inner pressure of a tire. When it is not inappropriate data, such data is excluded without using data for detecting an inner pressure of a tire, and the excluded data is returned to the remeasurement. The variation of the dynamic load radii are also compared with the basic value, and when an unstable running condition and a road surface state are deduced, they are excluded from data for detecting an inner pressure of a tire. However, such excluded data may be separately used at steps S15 and S16 for alarm signal for abnormality of road surface and of loading conditions.

At step S12, the differences (d) between the initial values of the dynamic load radii which are formed to be database by every speed in accordance with the GPS speed and the measured values of the dynamic load radii are calculated.

At step S13, the differences (d) calculated at step S12 are compared with the basic value. When the differences (d) are larger than the basic value, inner pressure (lowering) alarm is raised at step S14, and when the differences (d) are smaller than the basic value, the excluded data is returned to the remeasurement.

FIG. 2 is a flow chart of a method of using an average value of measured values in order to improve accuracy of the measurement (calculation) of the dynamic load radii and a calculation program in the case of using a statistical means for selecting data adopted for calculation of the average value.

Steps S1 to S11 show calculation processes equivalent to the flow chart of FIG. 1, and at step S101, the measured values of the dynamic load radii are stratified (classified) in accordance with ranks of the GPS speed.

At step S102, the measured values of the dynamic load radii stratified at step S101 are accumulated by every N pieces of values (for example, 30 values) by every speed rank.

At step S103, fluctuation of the dynamic load radii data by each of every GPS speed rank which are accumulated by every N piece of values at step S102 is judged by population variance, and when a dispersion value ($\sigma^2$) is smaller than the basic value, it is judged to be effective data.

At step S104, the average value of the dynamic load radii is calculated based on the data which were judged to be effective at step S103.

At step S105, the average value of the dynamic load radii calculated at step S104 is compared with the initial value, and when the difference is large, an inner pressure (lowering) alarm is raised at step S106.

At step S107, the average value of front wheels of the average value of the dynamic load radii calculated at step S104 is compared with the average value of rear wheels, and when the difference of values between the front wheels and the rear wheels is large, a low abrasion coefficient ($\mu$) on a road surface or an abnormal loading is deduced, and an alarm of an abnormal road surface or abnormal loading is raised at step S108.

The respective flow charts of FIG. 1 and FIG. 2 show partial calculation programs used for the method for detecting decrease in an inner pressure of a tire according to the present invention as separate flow charts, but these partial calculation programs can be built into one calculation program.

Examples of values of various initial data used in the calculation programs shown in FIG. 1 and FIG. 2, and the basic values used for various judgments are shown in the following by raising the applied types of vehicles and tires.

Examples showing results of an actual running test for confirming the performance of the method for detecting an inner pressure of a tire according to the present invention as shown in the flow charts of FIG. 1 and FIG. 2 are shown in the following, wherein the conditions in the actual running test including a test course are also shown.

Type of test vehicle: Audi A4
GPS speed meter: V-BOX II (manufactured by Race Logic Co.)
Test place: Okayama Test Course of Sumitomo Rubber Industries, Ltd. and peripheral general roads.

Test Conditions
Tire type: 205/55R16 SP9000
Basic inner pressure: 220 kPa (front wheels), 210 kPa (rear wheels).
Reduced pressure by 40%: 132 kPa (front wheels), 126 kPa (rear wheels)

| Initial values of dynamic load radii | | |
|---|---|---|
| @ 40 ± 20 km/h | Front wheels: 304.9 mm | Rear wheels: 304.5 mm |
| @ 80 ± 20 km/h | Front wheels: 305.2 mm | Rear wheels: 304.8 mm |
| @ 120 ± 20 km/h | Front wheels: 306.0 mm | Rear wheels: 305.6 mm |
| @ 160 ± 20 km/h | Front wheels: 307.4 mm | Rear wheels: 307.0 mm |

Judgment Criteria of Running Conditions
Linear running: change in running direction information (0 to 360 degrees) for one second is within one degree
Judgment of sloping road: variation of the altitude information for 5 seconds is within 1 m
Acceleration and deceleration: time differential of GPS speed is within 0.1 G
Stratified speed: 20 to 60 km/h, 60 to 100 km/h, 100 to 140 km/h and 140 to 180 km/h
Judgment of population variance: accumulation of 30 pieces $\sigma^2 < 0.1$.
Basic value of comparison between the front and rear wheels: at least 1%
Calculation method=((Average value of front wheel measurement/Initial average value of front wheels)−(Average value of rear wheel measurement/Initial average value of rear wheels))×100

Correction of Time at Calculating Speeds
Difference between GPS acquisition time and tire rotational speed acquisition time=0.2 second
GPS correction speed(T)=GPS(T−1)+(GPS(T)−GPS(T−1))×0.8

EXAMPLE 1

Running condition 1: 2 persons in a vehicle, the vehicle ran on a circuit road at a speed of 110 to 130 km/h, and ran on various handling roads at a speed of until 60 km/h.

In either case, it could be detected that the dynamic load radii of depressurized tires were decreased by at least 0.5%.

EXAMPLE 2

Running condition 2: 2 persons in a vehicle, the vehicle ran on a general road (up and down on a mountain road, and a pebble road) at a speed of at most 60 km/h.

TABLE 2

| | Front wheels | | Rear wheels | |
|---|---|---|---|---|
| | Right | Left | Right | Left |
| Initial value | 305.0 | 305.0 | 304.7 | 304.7 |
| 40%-depressurized front left wheel | 305.0 | 302.9 (−0.7%) | 304.7 | 304.7 |
| 40%-depressurized rear wheels | 305.0 | 305.0 | 302.5 (−0.7%) | 302.5 (−0.7%) |
| 40%-depressurized whole wheels | 302.9 (−0.7%) | 302.9 (−0.7%) | 302.5 (−0.7%) | 302.5 (−0.7%) |

In either case, it could be detected that the dynamic load radii of depressurized tires were decreased by at least 0.5%.

EXAMPLE 3

Running condition 3: 2 persons in a vehicle, the vehicle ran on an artificial road with low μ. A vehicle with 2 persons ran at a speed of at most 40 km/h.

TABLE 3

| | Front wheels | | Rear wheels | |
|---|---|---|---|---|
| | Right | Left | Right | Left |
| Initial value | 300.4 | 300.4 | 304.7 | 304.7 |
| 40%-depressurized whole wheels | 294.2 | 294.2 | 302.5 | 302.5 |

Front wheels: 2.1%, Rear wheels: 0.72% (difference between front wheels and rear wheels = 1.38%)

In either case, it could be detected that the dynamic load radii of depressurized tires were decreased by at least 0.5%,

TABLE 1

| | Circuit road | | | | Handling road | | | |
|---|---|---|---|---|---|---|---|---|
| | Front wheels | | Rear wheels | | Front wheels | | Rear wheels | |
| | Right | Left | Right | Left | Right | Left | Right | Left |
| Initial value | 306.1 | 306.1 | 305.6 | 305.6 | 305.0 | 305.0 | 304.7 | 304.7 |
| 40%-depressurized front left wheel | 306.1 | 304.4 (−0.6%) | 305.6 | 305.6 | 305.0 | 302.9 (−0.7%) | 304.7 | 304.7 |
| 40%-depressurized rear right wheel | 306.1 | 306.1 | 304.0 (−0.5%) | 305.6 | 305.0 | 305.0 | 302.5 (−0.7%) | 304.7 |
| 40%-depressurized rear wheels | 306.1 | 306.1 | 304.0 (−0.5%) | 304.0 (−0.5%) | 305.0 | 305.0 | 302.5 (−0.7%) | 302.5 (−0.7%) |
| 40%-depressurized whole wheels | 304.4 (−0.6%) | 304.4 (−0.6%) | 304.0 (−0.5%) | 304.0 (−0.5%) | 302.9 (−0.7%) | 302.9 (−0.7%) | 302.5 (−0.7%) | 302.5 (−0.7%) | and difference between a front wheels and rear wheels exceeds 1%, thereby a road surface (loading) alarm can be raised.

EXAMPLE 4

Running condition 4: 2 persons in a vehicle and a load of 100 kg mounted on a loading space at a speed of at most 60 Km/h.

TABLE 4

|  | Front wheels | | Rear wheels | |
| --- | --- | --- | --- | --- |
|  | Right | Left | Right | Left |
| Initial value | 305.0 | 305.0 | 300.1 | 300.1 |
| 40%-depressurized whole wheels | 302.9 | 302.9 | 294.0 | 294.0 |

Front wheels: 0.68%, Rear wheels: 2.03% (difference between front wheels and rear wheels = 1.35%)

In either case, it could be detected that the dynamic load radii of depressurized tires were decreased by at least 0.5%, and difference between front wheels and rear wheels exceeds 1%, thereby a road surface (loading) alarm can be raised.

As described above, in any of Examples, decrease in an inner pressure can be detected by calculating accurate dynamic load radii and judging a case of occurring a change of at least 0.5% as lowering of an inner pressure.

Further, slip and loading alarms can be also raised in respective cases of running on a road with low μ and load burden.

According to the present invention, a method for detecting decrease in an inner pressure of a tire with excellent accuracy by calculating accurate dynamic load radii by comparing the GPS speed information with tire rotational speed information collecting data only when a stable measurement of the dynamic load radii is possible, as well as by utilizing GPS positioning information for a running state of a vehicle, and an apparatus and a program thereof can be provided.

What is claimed is:

1. A method for judging decrease in an inner pressure of a tire from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

2. The method of claim 1, wherein even when the dynamic load radius values are continuously judged to be effective, any measured values are judged to be ineffective if change in size of dynamic load radius measured values exceeds a predetermined degree of change, and decrease in an inner pressure is judged only by measured values other than the ineffective measured values.

3. The method of claim 1, wherein when the dynamic load radius values are continuously judged to be effective, average values of respective four wheels are calculated, and decrease in an inner pressure is judged by the average values.

4. The method of claim 1, wherein decrease in an inner pressure of a tire is judged by comparing the dynamic load radius values judged to be effective with the initial value preliminarily stored as the dynamic load radius value by every speed at a normal inner pressure based on the calculated speed of the vehicle by the GPS device at the time.

5. The method of claim 1, wherein decrease in an inner pressure of a tire is judged by comparing the dynamic load radius values judged to be effective with the initial value preliminarily stored as the dynamic load radius value by every speed at a normal inner pressure obtained by classifying results of measuring the dynamic load radii based on the calculated speed of the vehicle by the GPS device at the time.

6. The method of claim 3, wherein a predetermined number for every speed range is stored in a certain time range, and only when population variance sizes of the respective four wheels are smaller than a specified value, decrease in an inner pressure is judged by the average values of the respective four wheels.

7. The method of claim 1, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

8. The method of claim 2, wherein decrease in an inner pressure of a tire is judged by comparing the dynamic load radius values judged to be effective with the initial value preliminarily stored as the dynamic load radius value by every speed at a normal inner pressure based on the calculated speed of the vehicle by the GPS device at the time.

9. The method of claim 3, wherein decrease in an inner pressure of a tire is judged by comparing the dynamic load radius values judged to be effective with the initial value preliminarily stored as the dynamic load radius value by every speed at a normal inner pressure based on the calculated speed of the vehicle by the GPS device at the time.

10. The method of claim 2, wherein decrease in an inner pressure of a tire is judged by comparing the dynamic load radius values judged to be effective with the initial value preliminarily stored as the dynamic load radius value by every speed at a normal inner pressure obtained by classifying results of measuring the dynamic load radii based on the calculated speed of the vehicle by the GPS device at the time.

11. The method of claim 3, wherein decrease in an inner pressure of a tire is judged by comparing the dynamic load radius values judged to be effective with the initial value preliminarily stored as the dynamic load radius value by every speed at a normal inner pressure obtained by classifying results of measuring the dynamic load radii based on the calculated speed of the vehicle by the GPS device at the time.

12. The method of claim 2, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

13. The method of claim 3, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

14. The method of claim 4, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

15. The method of claim 5, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

16. The method of claim 6, wherein when an inner pressure of two coaxial wheels is judged as decreased, in the case that difference is larger than the specified value, as comparing an average value of change in size from the initial values of dynamic load radii of the two front axial wheels with an average value of change in size from the initial values of the dynamic load radii of the two rear axial wheels, alarm for slipping on a road surface or for loading is raised aside from the judgment of decrease in an inner pressure.

* * * * *